RAY & RAND.
Vapor Gas Generator.
No. 28,503.
Patented May 29, 1860.
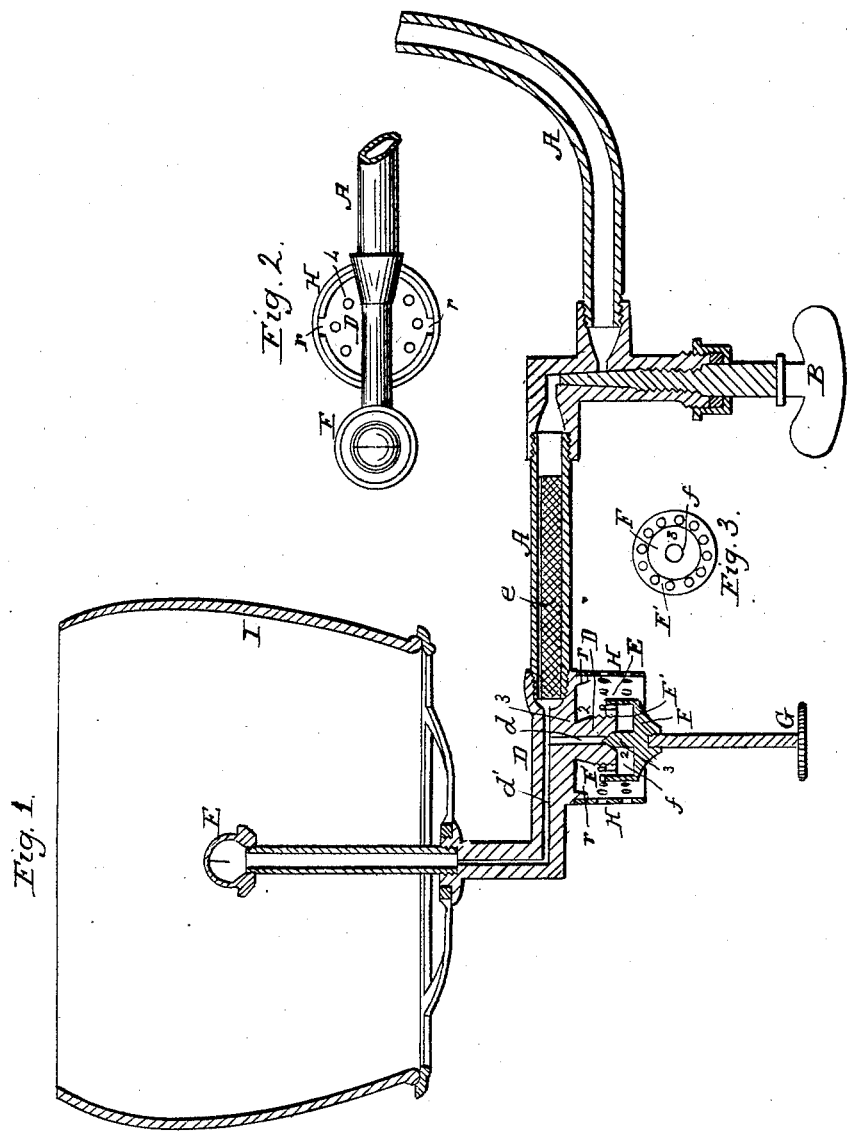

UNITED STATES PATENT OFFICE.

THO. S. RAY AND A. C. RAND, OF BUFFALO, NEW YORK.

VAPOR-LAMP.

Specification of Letters Patent No. 28,503, dated May 29, 1860.

*To all whom it may concern:*

Be it known that we, THOMAS S. RAY and ALONZO C. RAND, of the city of Buffalo, county of Erie and State of New York, have invented certain new and useful Improvements in Vapor-Gas Generators; and we do hereby declare that the following is a full, clear, and exact description of the same, reference being had to the accompanying drawings and the letters of reference marked thereon.

Figure I is a vertical longitudinal section of our improvement. Fig. II is a plan of the same. Fig. III is a plan of the generating cup.

Letters of like name and kind refer to like parts in each of the figures.

A, represents the main conducting pipe which conveys the fluid from the reservoir to the generator when it is formed into gas.

(B) is a stop cock by means of which the flow of the fluid is regulated.

(C), is a piece of lampwick or felting, placed in the pipe (A) between the stop cock (B) and the generator. It acts as a filter, and accelerates the change of the fluid to vapor.

(D) represents the vaporizing pipe having a small bore ($d'$). This connects with the burner and with the pipe containing the filter. It also has a downward projection ($D^2$) which connects with the generating cup. This projection has a small aperture $d^3$, which connects with the bore ($d'$) and opens into the generating cup.

F represents the generating cup. Its bottom is made solid (as represented in Fig. I) and its top is partly covered with a perforated ring (F') forming a vapor chamber ($f^2$). It has a central stop ($f^3$) made conical at its upper end which conical part is made to nicely fit and close the aperture ($d^3$) in the projection ($D^2$). The cup (F) screws on to the projection ($D^2$) in a manner to cause the stop ($f^3$) to close or partly close (as the case may be) the aperture ($d^3$) so as to admit a greater or less quantity of gas or fluid through the aperture into the cup. By means of the thumb piece G the cup may be turned more or less so as to regulate the quantity of fluid or gas passing into the generating cup. The vaporizing pipe (D) has in connection therewith a circular heating plate as shown at ($D^4$) (Fig. II). This plate is perforated.

H, represents a screen which surrounds the generating cup to protect the flame which issues from the cup. It is made of perforated sheet metal or wire gauze and is connected to the plate ($D^4$) by means of the lugs (r) so as to leave ample air space between it and the plate.

I is the glass globe; (E), burner.

Operation: the reservoir being filled with ordinary burning fluid the stop cok (B) is turned so as to allow a small quantity of fluid to pass through the filter (C). The generating cup is also turned slightly so as to lower the stop ($f^3$) from the aperture $d^3$ and allow a small quantity of fluid to pass into the chamber ($f^2$). The fluid thus passing into the chamber may be lighted with a match, and the heat arising therefrom will quickly change the fluid which issues from the filter, into vapor or gas— or an ordinary alcohol torch may be used for lighting. As soon as the heat is sufficient to change the fluid into vapor the generating cup will be supplied with vapor which vapor will burn with a thin blue flame issuing through the perforated ring (F') and striking against the pipe D and the perforated heating plate $D^4$. This will heat the vaporizing pipe (D) very hot, by which the fluid passing into the filter and through into the vaporizing pipe (D) will be converted into the purest gas or vapor in the pipe (D) before it reaches the burner (E).

By this device we produce the vapor or gas which supplies the light flame or burner E by means of a flame or heat separate and independent of the light flame or burner E. We also dispense with generators tubes and all devices which are dependent upon the light flame for heat and leave the light flame entirely free and unobstructed.

We claim

The generating cup (F) in combination with the vaporizing tube (D) and supply or aperture $d^3$ the same being constructed arranged and operating substantially as herein set forth.

THOS. S. RAY.
ALONZO C. RAND.

Witnesses:
E. B. FORBUSH,
W. H. FORBUSH.